Figure 3:
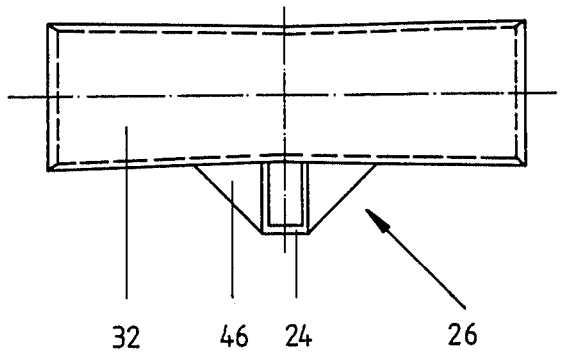

United States Patent [19]

Oberholzer et al.

[11] Patent Number: 4,780,025

[45] Date of Patent: Oct. 25, 1988

[54] DEVICE FOR LAYING AND SUSPENDING CABLES

[75] Inventors: Franz Oberholzer, Oetwil am See; Kurt Zbinden, Hausen, both of Switzerland

[73] Assignee: Kabelwerke Brugg AG, Brugg, Switzerland

[21] Appl. No.: 18,205

[22] Filed: Feb. 24, 1987

[30] Foreign Application Priority Data

Sep. 13, 1986 [CH] Switzerland ............ 03681/86

[51] Int. Cl.[4] ............................................. F16L 3/00
[52] U.S. Cl. ......................... 405/150; 405/146; 405/154; 248/74.1
[58] Field of Search ............. 405/146, 150, 303, 154; 248/74.1, 61, 68.1, 65, 62, 60

[56] References Cited

U.S. PATENT DOCUMENTS

| | | | |
|---|---|---|---|
| 3,650,499 | 3/1972 | Biggane | 248/62 |
| 3,884,438 | 5/1975 | Logsdon | 248/74.1 X |
| 4,051,682 | 10/1977 | Lockwood | 405/146 X |
| 4,267,994 | 5/1981 | Lynch et al. | 248/74.1 X |
| 4,638,966 | 1/1987 | Ford | 248/62 |

Primary Examiner—Dennis L. Taylor
Attorney, Agent, or Firm—Bachman & LaPointe

[57] ABSTRACT

A device for laying and suspending cables (38), in particular low-voltage, medium-voltage and signal cables, is fitted in a man-sized duct or tunnel with brackets (10) secured in spaced relationship on the inner periphery of the duct or tunnel or on diagonal braces. These brackets are used for supporting cables (38) drawn in guide tubes (32).

The brackets (10) projecting into the duct or tunnel are made tubular and have at least one flat outer surface (42, 44) extending over the entire length. The brackets are equipped with a locking device (22) at the free end (20).

A guide connection (24) of at least one tube saddle (26) having a hard-plastic cable guide tube (32) which runs approximately at right angles to the longitudinal axis (A) of the guide connection (24) and of the bracket (10) and has a low coefficient of friction is arranged on each bracket (10). The outer contours of the bracket (10) correspond to the inner contours of the guide connection (24) and the latter is displaceable in the direction of the said longitudinal axis (A).

10 Claims, 3 Drawing Sheets

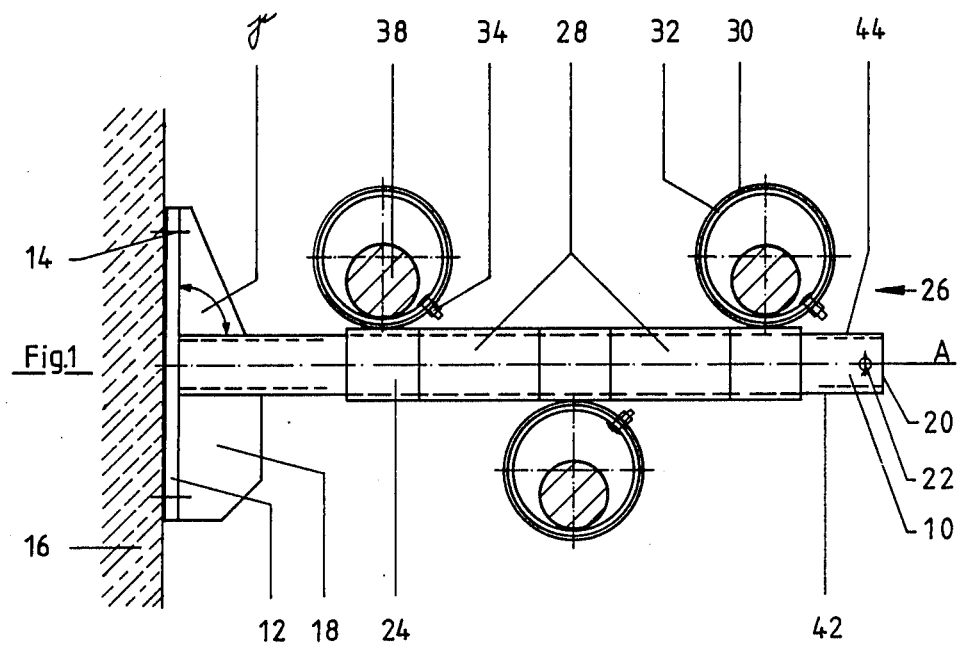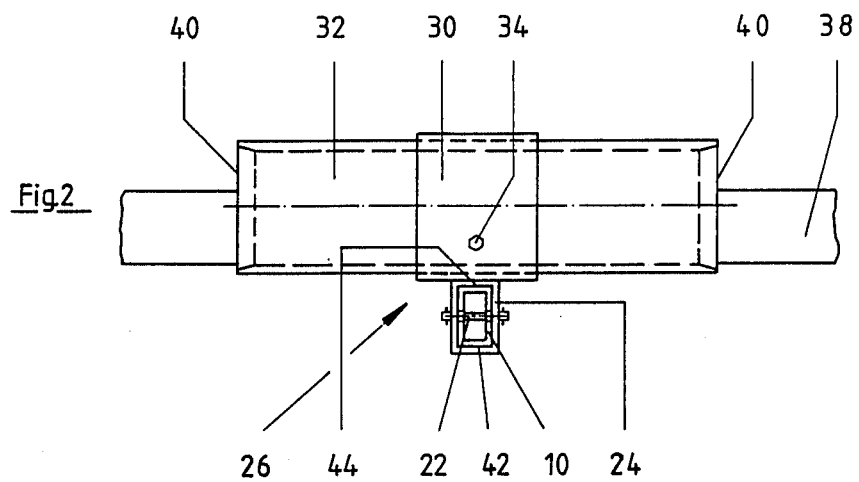

DEVICE FOR LAYING AND SUSPENDING CABLES

The invention relates to a device for laying and suspending cables, in particular low-voltage, medium-voltage and signal cables, in a man-sized duct or tunnel, having brackets, secured in spaced relationship on the inner periphery of the duct or tunnel or on diagonal braces, for supporting the cables drawn in guide tubes.

For laying cables as used in the electrical industry, the practice for a long time has been first of all to lay the cables along the entire length of the floor. The cables are then lifted on platforms which normally have a U-shaped or L-shaped cross-section and are fixed to a wall or the roof of a duct or tunnel. This system is not only time consuming and therefore expensive, it also has further disadvantages:

At high current passage, the cables can heat up to temperatures up to about 70° C. Consequently, the metallic conductors expand in their longitudinal direction and in doing so can shift laterally beyond the platform and cause damage to the cables.

On inclines or lateral bends, the platforms have to be adapted at great expense.

According to a more recent variant, a plurality of cable saddles are arranged in place of the platforms, onto which cable saddles the heavy cables have to be lifted with cranes or other lifting gear after being drawn in via rollers laid on the floor. The disadvantage also remains that the position of the cables laid onto the saddles in the longitudinal direction can hardly be changed again.

It is therefore proposed in the Swiss Patent Specification No. 571,783 to provide at least one supporting roller which projects beyond the surface of a saddle and is fixed to it, via which supporting roller the cables can be drawn in. The supporting rollers are preferably detachable. Thus the heavy cables no longer have to be first laid on the floor of the duct or tunnel and then lifted into the cable saddles.

In the Swiss Patent Specification No. 586,964 a further development of the above embodiment is described which is arranged in particular in the area where the cables change directions. The cable guide is made tubular and in a trumpet shape toward both ends. Fixed on the tubular cable guide are at least three supporting rollers which are arranged uniformly around its periphery and can preferably be removed. The cable guide is universally rotatably mounted by means of a ball-and-socket joint.

Both embodiments according to the Swiss patent specifications are unsatisfactory, because they necessitate a considerable amount of material and work. If the supporting rollers are removed, the heavy cables in the cable boxes or tube guides of steel can hardly be moved again in the longitudinal direction.

The object of the inventors is to create a device for laying and suspending cables of the type mentioned at the beginning which does not have the disadvantages of the cable holders described. The intention is that the cables, in particular heavy cables, can be pulled simply and inexpensively directly onto the cable holders, and that, arranged on the latter, they can always be moved in a longitudinal direction.

The object is achieved according to the invention in that the brackets projecting into the duct or tunnel are made tubular, having at least one flat outer surface extending over the entire length, and are equipped with a locking device on the free end, and a guide connection of at least one tube saddle having a hard-plastic cable guide tube which runs approximately at right angles to the longitudinal axis of the guide connection and of the bracket and has a low coefficient of friction is arranged on each bracket, with the outer contours of the bracket corresponding to the inner contours of the guide connection and the latter being displaceable in the direction of the said longitudinal axis.

The man-sized ducts or tunnels are directed in the direction of the consumers, in particular from distribution centers of power stations, and the main lines are made accessible at all times until they branch into the ground. The inner peripheries of the ducts or tunnels are formed by the two side walls, the floor and the roof, with it being possible for at least the transitions to be made round. The walls are normally made of concrete; if necessary diagonal braces of a known construction can also be arranged.

The brackets preferably have at least two flat outer surfaces. Consequently, the flat outer surfaces not only fulfill the function of preventing the tube saddle from turning about the longitudinal axis of the bracket but also enable the tube saddles to be mounted in a diagonally opposite or angled position, and standing or suspended in the case of horizontal brackets, which leads to much better utilization of space. In practice, the brackets, with respect to the outer cross-section, are made in particular round, with at least two flat surfaces, rectangular, square, triangular, hexagonal or octagonal, always of course as a regular figure. The more flat surfaces available, the greater is the range of positions for the tube saddles, whether diagonally opposite or angled.

According to a first variant, the tube saddles positively engaged with the brackets are made in one piece of a hard plastic which can be injection molded and has a good sliding capacity so that the heavy cables can be pulled in with the least possible resistance and can still change their position later. Polymers in particular, for example polyethylene, polyamides or trilon, are suitable materials for a tube saddle. The transition from the guide connection penetrating through a bracket to the cable guide tube disposed approximately at right angles to the guide connection consists of a plastic web, or for increasing the stability two plastic webs, injection molded in one piece with the guide connection and the cable guide tube.

According to a further variant, the tube saddles are made of various materials and are joined together. A sleeve is welded approximately at right angles onto the metallic guide connection. The cable guide tube made of a slidable hard plastic is pushed into this sleeve and is preferably fixed by means of a locking screw.

The two variants do not differ with respect to the cable guide tube; in the first case only the guide connection is likewise made of a hard plastic, but in the second case it is preferably made of stainless steel or aluminum.

In practice, it has turned out to be advantageous to open out the cable guide tube in tapered manner at least on one side.

When the cables change in direction, in particular when there are steep upward or downward inclines, the cables are preferably fixed. This can be done in two ways:

At least one wedge of flexible material, preferably rubber, is thrust into the corresponding cable guide tube(s). In the case of a cable guide tube opened out at least on one side, it is easier to insert the wedges for fixing the cable(s) guided through.

A fixing point for the cable is fixed on the periphery of the duct or tunnel. This is in particular a metal section with one or more clips for clamping the cables.

The tube saddles are freely movable in the longitudinal direction of the brackets and when required can be arranged standing or suspended at certain intervals, for example when the brackets are horizontally arranged. If required, their mobility in the longitudinal direction of the bracket can be restricted by one or more distance pieces being fitted between every two tube saddles arranged adjacently on a bracket.

The locking device provided at the free end of the bracket is expediently made as a pin which penetrates through two oppositely located tube walls and preferably has a pin retainer of conventional construction.

Figure 4:
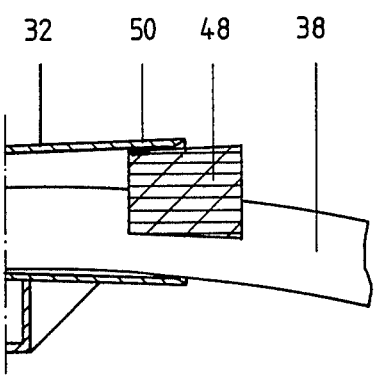
Figure 5:
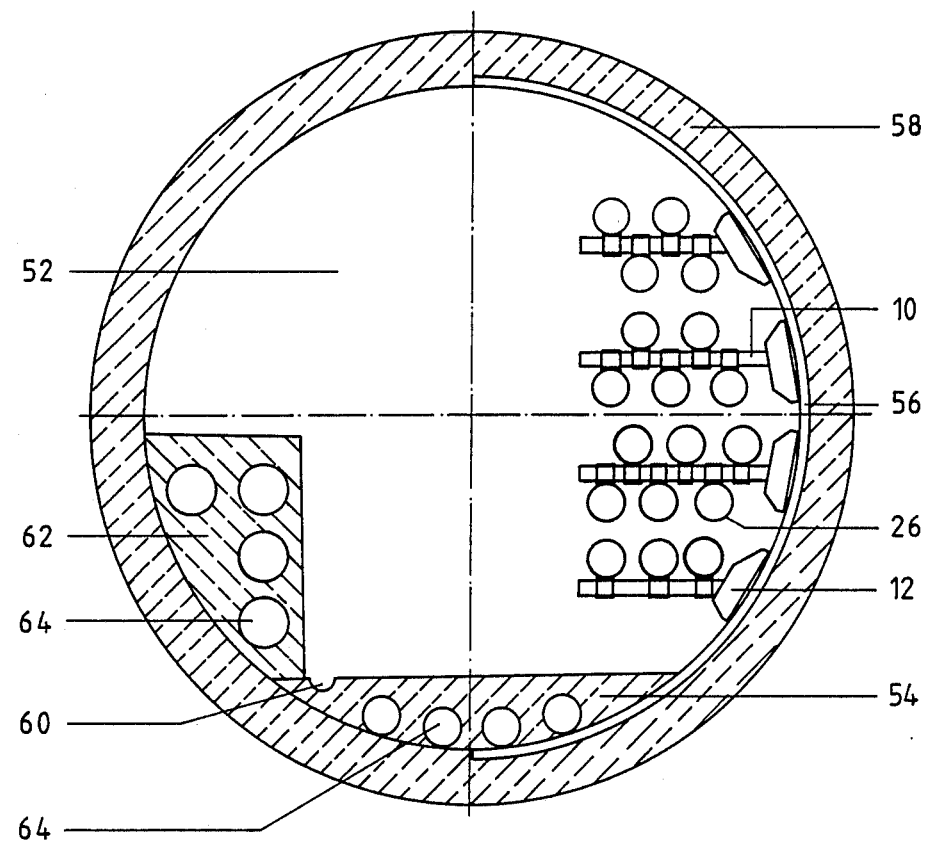

The invention is described in greater detail with reference to the exemplary embodiments shown in the drawing, in which schematically:

FIG. 1 shows a partly cut-away view of a horizontal bracket with two standing tube saddles and a suspended tube saddle in the longitudinal direction of the cable, FIG. 2 shows a partly cut-away view of the cable suspension of FIG. 1, in the longitudinal direction of the bracket, FIG. 3 shows a view of a tube saddle which is made in one piece and has a cable guide tube opened out in tapered manner on both sides, FIG. 4 shows a partial section through a cable tube which is opened out on one side in a trumpet shape and has an inserted cable which is fixed by a wedge, and FIG. 5 shows a cable tunnel in cross-section, with a device for laying and suspending cables.

FIG. 1 shows a bracket 10 with a welded-on baseplate 12 which is fixed in the vertical concrete wall 16 of a man-sized tunnel by means of a bolt 14, shown only by a line for the sake of simplicity. A reinforcing plate 18 increases the load-bearing capacity of the bracket. The angle γ between the bracket 10 and the baseplate 12 is 90°; but it can also be made obtuse or acute if the tunnel wall is of sloping or curved configuration and a horizontally disposed bracket is desired.

The free end 20 of the bracket is provided with a locking device 22 consisting of a locking pin and a pin retainer.

The bracket 10, rectangular in cross-section (FIG. 2), penetrates through the guide connection 24 of two standing tube saddles 26 and one suspened tube saddle 26 arranged inbetween. The position of the tube saddles is freely adjustable between the locking device 22 and the reinforcing angle 18. However, distance rings 28 arranged between the tube saddles 26 ensure that the tube saddles have to maintain a minimum spacing.

The individual tube saddles consist of the guide connections 24 (already mentioned) of stainless steel or aluminum, a sleeve 30 of the same metal welded onto the guide connection 24 approximately at right angles to the longitudinal direction A of the bracket, and a cable guide tube 32. The cable guide tube 32 is fixed in the sleeve 30 by means of a locking screw 34 with a plastic head.

Compared with the known methods, the cable can be pulled effortlessly with a haulage rope into the cable guide tube, made of plastic, and can also be displaced there later in the longitudinal direction.

The length ratio of the sleeve 30 and the cable guide tube 32 is indicated in FIG. 2. The latter is about 20 to 50 centimeters long in practice. To facilitate insertion of the cable, the two end faces 40 of the cable guide tube 32 are chamfered.

The bracket 10, rectangular in cross-section, and the guide connection 24 are pushed one over the other with clearance.

The two flat, parallel surfaces 42 and 44 of the bracket 10 permit a standing and suspended arrangement of the tube saddle 26.

The tube saddle 26 shown in FIG. 3 and made completely of plastic has a guide connection 24, rectangular in cross-section, and a cable guide tube 32 which is connected to the guide connection 24 by means of two webs 46 and is opened out in a tapered shape on both sides.

FIG. 4 shows a cable guide tube 32 opened on one side in a trumpet shape, as used where there are pronounced changes in the direction of the cables 38. A rubber wedge 48 is inserted into the widened opening of the cable guide tube 32 and presses the cable 38 against the lower part of the opened-out wall 50.

FIG. 5 represents a tunnel 52 with tube saddles 26 mounted on horizontal brackets 10. The baseplates 12 of the brackets 10 are fixed in a groove 56 which runs along the inner wall of the concrete pressure pipe 58. The floor 54, provided with a water outlet 60, and a terrace 62 contain tubes 64 which serve to further develop the basic system.

It can be clearly seen from FIG. 5, in conjunction with FIG. 1, that the space available in the man-sized tunnel 52 can be optimally utilized. If required, four to six or even more tube saddles 26 can readily be arranged on the bracket 10 in accordance with the geometric relationships—if necessary omitting the distance rings 28. On the lowermost bracket, all three tube saddles are in a standing position.

As already mentioned, the brackets 10 can also be arranged in suspended manner on the roof of the tunnel or standing on its floor 54.

We claim:

1. A device for laying and suspending cables comprises a bracket having a base and a tubular member projecting from said base plate along a longitudinal axis (A) and having a free end, said tubular member having an outer surface configuration which includes at least one flat surface extending over the entire length thereof; a locking device on the free end of said tubular member and a tube saddle mounted on said tubular member between said base plate and said locking device, said tube saddle comprising a tubular connection portion having an inner surface configuration corresponding to the outer surface configuration of said tubular member received over said tubular member for lateral movement thereon along said longitudinal axis (A), a sleeve member affixed to said tubular connection portion and a cable guide tube within said sleeve member, said cable guide tube having a longitudinal axis which is perpendicular to said longitudinal axis (A).

2. A device according to claim wherein the bracket has at least two flat substantially parallel outer surfaces.

3. A device according to claim 1 wherein said cable guide tube is formed of a material characterized by a low coefficient of friction.

4. A device according to claim 1 wherein the tube saddle is made in a single piece from a hard plastic polymer material.

5. A device according to claim 1 wherein the sleeve member is welded to the tubular connection portion and wherein a locking screw is provided in said sleeve member for securing said cable guide tube within said sleeve member.

6. A device according to claim 1 wherein the cable guide tube is flared in a trumpet shape.

7. A device according to claim 1 including a rubber wedge within said cable guide tube.

8. A device according to claim 1 including a plurality of tube saddles mounted on said tubular member and further including spacer pieces between the tubular connection portions of said plurality of tube saddles.

9. A device according to claim 1 wherein the locking device comprises a pin which passes through the tubular member.

10. A device for laying and suspending cable in a duct comprises a bracket having a base plate secured to the inner peripheral wall of the duct and a tubular member projecting from said base plate along a longitudinal axis (A) and having a free end, said tubular member having an outer configuration which includes at least one flat surface extending over the entire length thereof; a locking device on the free end of said tubular member and a tube saddle mounted on said tubular member between said base plate and said locking device, said tube saddle comprising a tubular connection portion having an inner surface configuration corresponding to the outer surface configuration of said tubular member received over said tubular member for lateral movement thereon along said longitudinal axis (A), a sleeve member affixed to said tubular connection portion and a cable guide tube within said sleeve member, said cable guide tube having a longitudinal axis which is perpendicular to said longitudinal axis (A).

* * * * *